United States Patent [19]
Hasse

[11] Patent Number: 5,607,248
[45] Date of Patent: Mar. 4, 1997

[54] SWIVEL APPARATUS

[75] Inventor: Gregory L. Hasse, Mankato, Minn.

[73] Assignee: Condux International, Inc., Mankato, Minn.

[21] Appl. No.: 380,606

[22] Filed: Dec. 30, 1994

[51] Int. Cl.$^6$ .................................................. F16D 1/12
[52] U.S. Cl. ................................. 403/78; 403/165; 59/95
[58] Field of Search ..................................... 403/165, 164, 403/78, 41, 60, 79; 59/95, 9; 411/301, 302, 303, 304, 947

[56] References Cited

U.S. PATENT DOCUMENTS

| | | | |
|---|---|---|---|
| 1,809,620 | 6/1931 | Cole | 411/303 |
| 2,318,119 | 5/1943 | Westhaver | 59/95 X |
| 2,466,243 | 4/1949 | Johnson . | |
| 2,625,005 | 1/1953 | Myers . | |
| 2,651,533 | 9/1953 | Miller | 403/164 |
| 2,811,378 | 10/1957 | Kalista | 403/78 X |
| 3,230,004 | 1/1966 | Lock . | |
| 3,836,268 | 9/1974 | Behnke | 403/165 |
| 3,940,194 | 2/1976 | Asberg . | |
| 4,600,331 | 7/1986 | Gray | 403/165 |
| 4,669,907 | 6/1987 | Patton | 403/165 X |
| 4,687,365 | 8/1987 | Promersberger | 403/2 |
| 4,708,382 | 11/1987 | LaCount . | |
| 4,911,579 | 3/1990 | Lutz et al. . | |
| 5,399,042 | 3/1995 | Ivel | 403/165 |

FOREIGN PATENT DOCUMENTS

| | | |
|---|---|---|
| 2109041 | 4/1995 | Canada . |
| 649996A1 | 4/1995 | European Pat. Off. . |
| 47830 | 11/1965 | Germany . |
| 1915343 | 10/1970 | Germany ............................. 403/164 |

OTHER PUBLICATIONS

Article entitled "Angular Contact Ball Bearings" from *SKF General Catalog*, pp. 251–258 and 3 cover pages, copyright 1991, labeled Exhibit O.

Condux International, Inc. brochure, entitled "Cable Installation Equipment & Tools," copyright 1991, pp. 24, 25, and 3 cover pages, labelled Exhibit A.
Condux International, Inc. brochure, entitled "808 Directional Boring swivel," 1 page, labelled Exhibit B.
Ardco Industries brochure, entitled "BoreKing™ Directional Boring Systems," 8 pages, copyright 1991, labelled Exhibit C.
Ardco Industries brochure, entitled "Boreking™ Directional Boring Systems," 4 pages, copyright 1991, labelled Exhibit D.
American Augers Inc. brochure, entitled "DD–15/DD–30 Directional Drills," 4 pages, labelled Exhibit E.
American Augers Inc. brochure, entitled "DD–40/DD–70 2 mid–sized drilling rigs from the world's foremost manufacturer of directional drills," 2 pages, dated Aug. 1992, labelled Exhibit F.
American Augers Inc. brochure, entitled "DD–140/DD–250/ DD–500 The highest quality drilling rigs from the world's foremost manufacturer," 4 pages, dated Mar. 1993, labelled Exhibit G.

(List continued on next page.)

*Primary Examiner*—Harry C. Kim
*Attorney, Agent, or Firm*—Merchant, Gould, Smith, Edell, Welter & Schmidt P.A.

[57] ABSTRACT

A swivel includes two heads rotatably mounted to one another with a bearing arrangement including at least two angular contact bearings arranged to receive a tension loading, and one angular contact bearing arranged in an opposite direction to receive a compression loading. The swivel is attachable, such as with a clevis, to underground drilling equipment for use in pulling a cable or conduit during a widening operation. A calcium-based grease lubricates the bearings. Periodic flushing with calcium-based grease is through a grease zerk and two single lip seals. A separate center pin for mounting the inner races of the bearings is threadably mounted to one of the heads, wherein an unthreaded portion of the shaft is positioned in a counterbore in the head.

10 Claims, 4 Drawing Sheets

OTHER PUBLICATIONS

Underground Technologies, Inc. brochure, entitled "Underground Technologies Inc. Specialists in Advanced Guided Boring Systems," 7 pages, labelled Exhibit H.

Design & Manufacturing Ltd. brochure, 3 pages, labelled Exhibit I.

*Trenchless Technology* publication, pp. 10 and 52, dated Jun. 1994, labelled Exhibit J.

Miller Construction Products brochure, entitled "Miller," 10 pages, labelled Exhibit K.

Ferguson Michiana, Inc. brochure, 1 page, labelled Exhibit L.

Condux International, Inc. 3–inch swivel drawing, 1 page, labelled Exhibit M.

Condux International, Inc. 2–inch swivel drawing, 1 page, labelled Exhibit N.

FIG. 3

SWIVEL APPARATUS

FIELD OF INVENTION

The present invention relates to swivels, and in particular to swivels for use in preventing rotational torque from interfering with an elongated product, such as a cable or a conduit, being pulled into position, such as in an underground drilling operation.

BACKGROUND OF THE INVENTION

A cable or conduit is sometimes installed underground leaving the environment where the cable or conduit is placed with an aesthetically pleasing appearance. The cable or conduit can be placed into a trench dug into the ground. Alternatively, underground drilling allows for the placement of cable or conduit underground without having to dig a trench the length of the cable or conduit. Such a procedure can be used to install cable or conduit under difficult to trench areas such as roads, rivers, or wetlands. Directional drilling allows for guided drilling of the hole to bypass obstructions or other areas undesirable to drill through.

To place the cable or conduit underground in a drilling operation, a hole is typically drilled underground from an above ground starting point to an above ground end point with equipment including a drill bit rotated through the ground by a drilling rig located above ground at the starting point. Once the hole is drilled from the starting point to the end point, the cable or conduit can be pulled back through the hole from the end point to the starting point. The pulling operation may be accompanied by a procedure whereby the hole initially drilled through the ground is enlarged or widened with a reamer and/or packer during the pulling operation. The widening operation typically utilizes rotational torque from the drilling rig located at the starting point. In that case, the drilling rig rotates a reamer or other widening tool to widen the hole. It is desired to attach the cable or conduit to the underground widening equipment so that the cable or conduit is pulled through the hole as the hole is widened by the widening equipment.

Rotations of about 150 to 200 revolutions per minute or more by the drilling rig may be utilized during the widening operation. It is desirable to prevent the transfer of rotational torque from the rotating widening equipment to the cable or conduit during pulling of the cable or conduit. A swivel can be utilized to prevent the transfer of rotational torque from the widening equipment to the cable or conduit. One concern in this area is that the swivel be able to withstand the tension loads encountered during pulling of the cable or conduit by the widening equipment without transfer of the rotational torque to the cable or conduit.

Another concern in the area of cable or conduit pulling is the presence of liquids and/or solids which pose a contamination risk with respect to any moving parts of the swivel. The hole may include naturally occurring water, mud, dirt, sand or rocks. The drilling and/or widening operation may also be accompanied by the use of flowing liquid added to assist in the formation of the hole and/or to remove particles from the hole. Bentonite may be added to the liquid to assist in removal of the dirt and rock particles. Bentonite is a very fine particle that is difficult to seal from contact with moving parts.

In addition to the desire to prevent the transfer of rotational torque during tension loadings, other concerns arise for pulling cable or conduit during the widening operation. In the case of underground drilling, the drilling operation to form the hole may be accomplished via directional drilling techniques where the drill bit is steered and/or moved about in a non-linear path during drilling from the starting point to the end point. Such non-linear drilling path can cause side load problems during the widening operation as the widening equipment and swivel traverse the curves.

Also, during the widening and pulling operation, an obstruction in the hole may be encountered where it is desirable to push back on the widening equipment in a direction from the starting point toward the end point. The pushing operation puts a compression loading on the swivel. The side load problem and the pushing problem create concerns for any swivel apparatus provided between the widening equipment and the cable or conduit.

In addition, other concerns arise during the widening and pulling operation including the desirability of a relatively high tension load to be placed on the swivel to accomplish the pulling operation, and the desirability of a relatively small diameter and length to the swivel.

There is a need in the art for a swivel apparatus which address the above concerns and other concerns.

SUMMARY OF THE INVENTION

The present invention relates to a swivel including first and second heads at opposite ends of the swivel, and a bearing arrangement between the first and second heads permitting rotational movement of the first head relative to the second head. The bearing arrangement includes at least two angular contact bearings arranged to receive a tension loading applied to the first and second heads, and one angular contact bearing arranged in an opposite direction to receive a compression loading applied to the first and second heads. Preferably, the bearing arrangement includes three angular contact bearings in the tension loading direction.

A calcium-based grease in the bearing arrangement lubricates the angular contact bearings. Two single lip seals between the first head and the second head are arranged in the same direction to seal against contaminants from entering the bearing arrangement and to also allow pressurized grease to exit from the bearing arrangement to an exterior of the swivel.

The present invention also relates to a swivel including a first head and a second head at opposite ends of the swivel, and a bearing arrangement positioned therebetween, with one of the heads including a central threaded aperture and a counterbore having a larger diameter than the threaded aperture. A center pin is threadably mounted to the threaded aperture. The center pin includes an unthreaded portion positioned in the counterbore of the head. The center pin mounts the bearing arrangement to the head.

The present invention also relates to a swivel including a first head and a second head at opposite ends of the swivel, and a bearing arrangement positioned therebetween, with one of the heads having two clevis arms spaced apart to define a slot. A clevis pin passes through both arms. The clevis pin has a head and a shaft extending therefrom, the shaft including threads. A lock nut releasably secures to the threaded end of the shaft to lock the shaft in position through both clevis arms. The lock nut preferably includes an oval-shaped metal insert. An unthreaded portion of the shaft is positioned in the slot.

DETAILED DESCRIPTION OF THE PREFERRED EMBODIMENTS

The swivel of the present invention is useable in a directional drilling operation where the swivel connects rotatable hole widening equipment to an elongated product. The swivel allows for rotation of the widening equipment without transfer of torque while the widening equipment is pulled back toward a drilling rig to pull the elongated product through the hole. A pushing force can also be applied with the drilling rig and widening equipment during rotation of the widening equipment to bypass or remove an obstruction in the hole. The swivel prevents rotational torque from being transferred from the widening equipment to the elongated product to prevent shearing of the equipment or the elongated product during the application of pulling loads, pushing loads and side loads.

Figure 1:
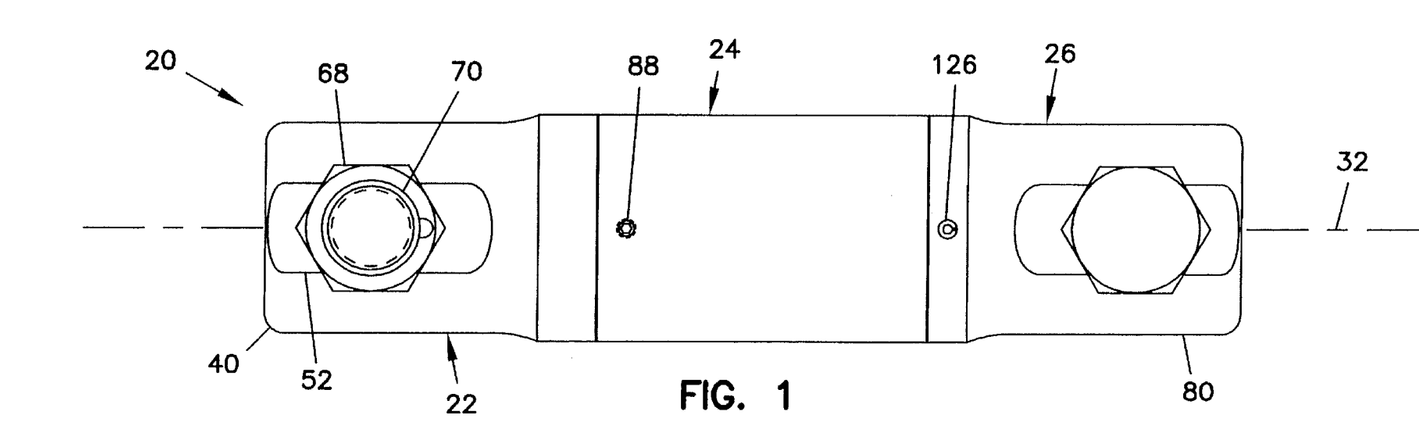
FIG. 1 is a top plan view of a first embodiment of a swivel in accordance with the principles of the present invention.
Figure 2:
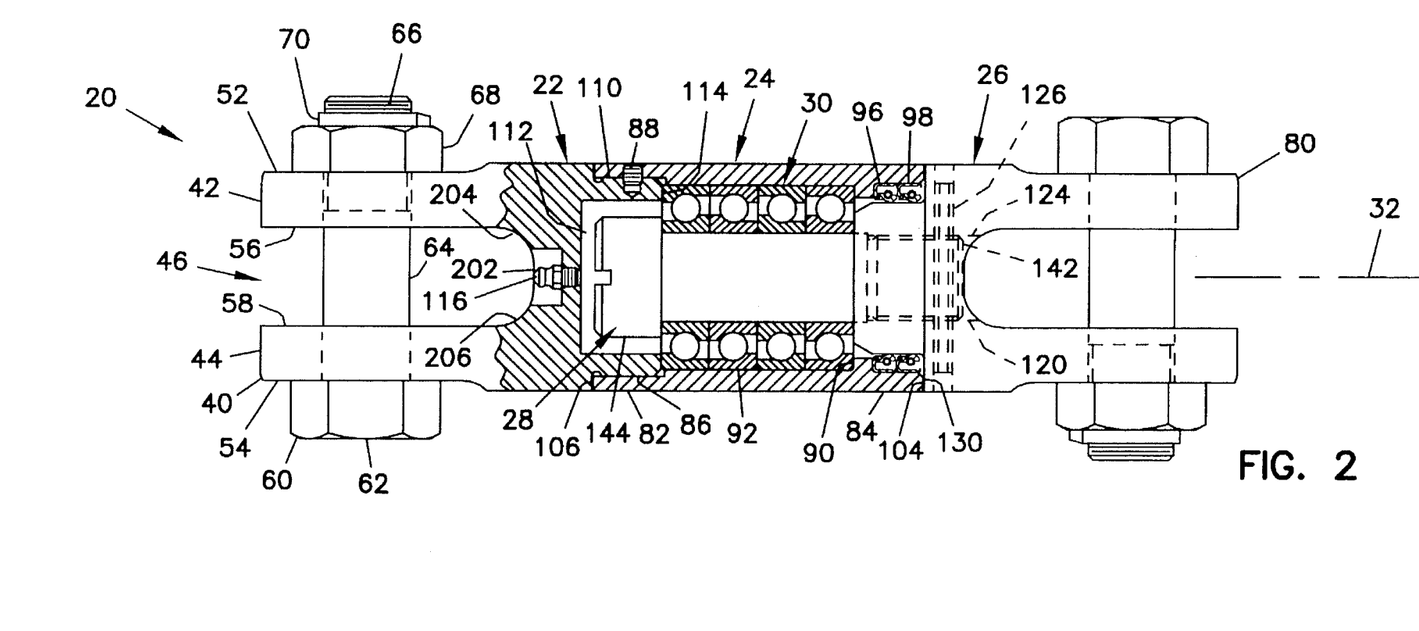
FIG. 2 is a partial cross-sectional side view of the swivel of FIG. 1.
Figure 3:
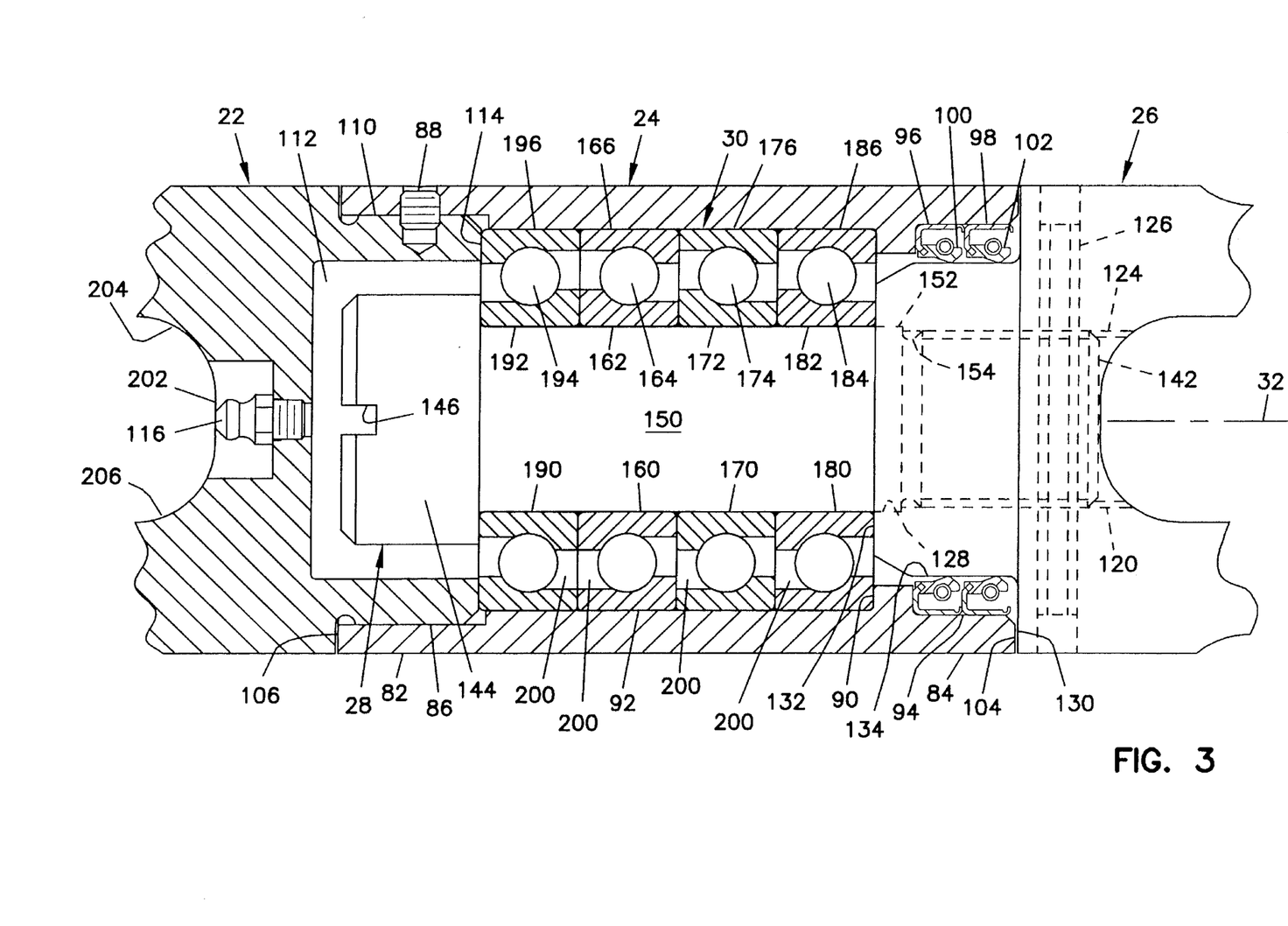
FIG. 3 is an enlarged view of a central portion of the swivel shown in FIG. 2.
Figure 4:
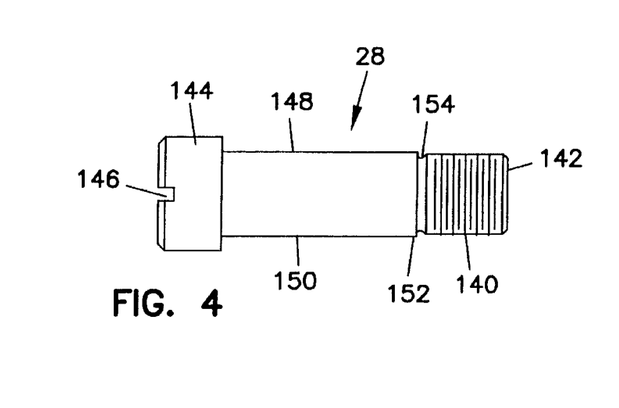
FIG. 4 is a side view of the center pin of the swivel of FIG. 1.
Figure 5:
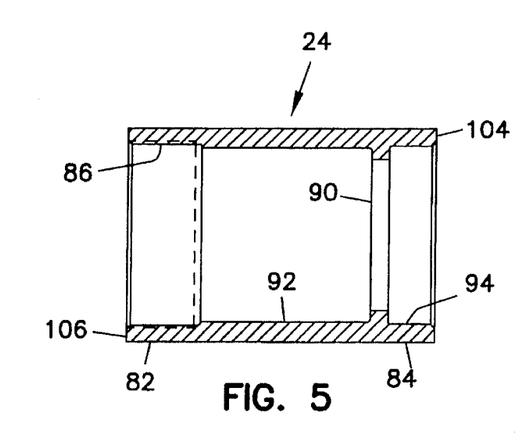
FIG. 5 is a cross-sectional side view of the body of the swivel of FIG. 1.
Figure 6:
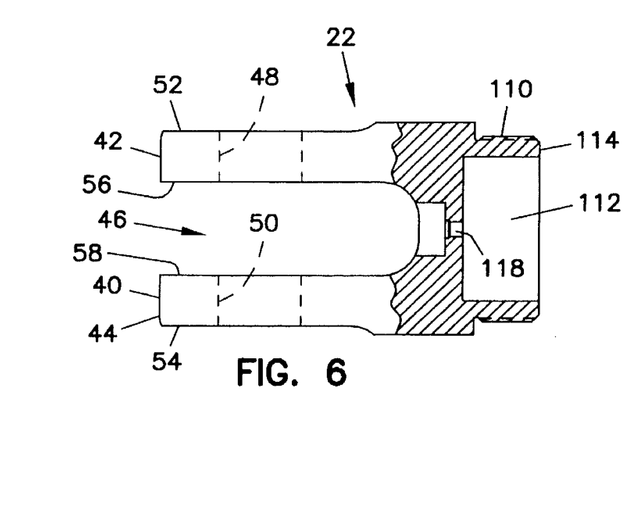
FIG. 6 is a partial cross-sectional side view of the externally threaded head of the swivel of FIG. 1.
Figure 7:
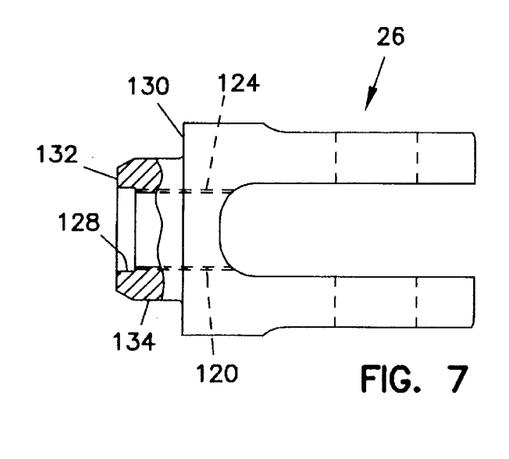
FIG. 7 is a partial cross-sectional side view of the internally threaded head of the swivel of FIG. 1.

Referring now to FIGS. 1–3, a first embodiment of a swivel 20 is shown including a first head 22 secured to body 24. A second head 26 at an opposite end of swivel 20 in the direction of a longitudinal axis 32 is secured to a center pin 28. A bearing arrangement 30 allows for rotational movement between first head 22/body 24 and second head 26/center pin 28. FIGS. 4–8 show various components of swivel 20.

To help facilitate manufacture, and also preferably repair of worn parts, first head 22 and body 24 are separate elements mounted together with threads in swivel 20. Similarly, second head 26 and center pin 28 are separate elements mounted together with threads to form swivel 20. Alternatively, second head 26 can include an integral center pin 28 including a threaded end and a separate nut or collar. See for example, FIGS. 9 and 10 as will be discussed in greater detail below.

To facilitate attachment to the pulling equipment, or the cable or conduit to be pulled, swivel 20 includes a clevis 40 associated with first head 22. Clevis 40 includes a first arm 42 spaced apart from second arm 44 to define a slot 46 therebetween. A passage 48 through first arm 42 and a passage 50 through second arm 44 allow for receipt of a clevis bolt or pin 60. Clevis pin 60 is secured with a nut 68, preferably a lock nut with a hex shape. First arm 42 includes an planar external seat surface 52 around passage 48, and second arm 44 includes an oppositely facing external seat surface 54 around passage 50 to allow for secure seating of clevis pin 60 with nut 68 and high strength for arms 42, Clevis pin 60 includes a hex head 62 and a shaft 64 extending therefrom. Threads 66 on shaft 64 permit rotational attachment of lock nut 68. Clevis pin 60 and lock nut 68 can be removed from first and second arms 42, 44, with ordinary wrenches even if shaft 64 becomes bent. If lock nut 68 cannot be removed, pin 60 can be cut, such as with a torch, and removed without damaging swivel 20. Lock nut 68 prevents the nut from inadvertently unscrewing, such as from vibrations, during use.

Shaft 64 is preferably threadless in the region positioned between inside surface 56 of first arm 42 and inside surface 58 of second arm 44. A lack of threads on shaft 64 in this region improves the strength of clevis 40 at the point where clevis 40 is attached to the rest of the system components.

Figure 8:
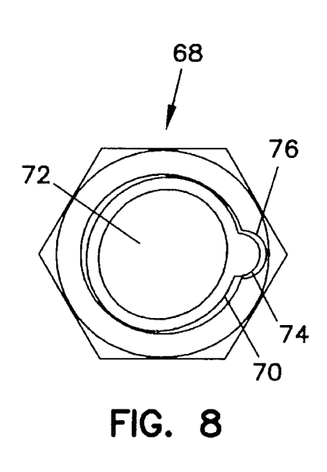
FIG. 8 is an enlarged end view of one of the lock nuts of the clevis of the swivel of FIG. 1.

With reference to FIGS. 1, 2 and 8, lock nut 68 includes an oval-shaped inner insert 70 defining a threaded oval-shaped passage 72. Insert 70 is press fit into an interior of lock nut 68 wherein a tab 74 resides in a recess 76 of lock nut 68 to prevent relative rotation. Insert 70 provides a resilient gripping force on threads 66 of clevis pin 60 to tightly secure lock nut 68 onto clevis pin 60 during use whether head 62 and lock nut 68 are tightly engaged with arms 42, 44. The oval shape of insert 70 resiliently grips threads 66 to prevent inadvertent unscrewing. Preferably insert 70 is made of metal, such as steel, which facilitates repeated attachment/detachment from clevis pin 60 during use. Reuse of lock nut 68 one hundred times or more is possible. A non-metal lock nut 68, such as a Nyloc nylon lock nut, may be used, but repeated reuse is limited as the resiliency of the nut sets during use.

Referring to FIGS. 1 and 2, swivel 20 includes a second clevis 80 associated with second head 26. The construction of second clevis 80 is similar as clevis 40 of first head 22. While clevis couplers 40, 80 are shown with respect to swivel 20, it is to be appreciated that one or both ends of swivel 20 can include other connecting structures for connecting the equipment to the cable or conduit, such as a single tang with a hole therethrough (see for example, FIGS. 8 and 9 as will be discussed in greater detail below), an internally threaded shaft, an externally threaded shaft, or a shaft which permits welding or other attachment mechanisms.

Referring to FIGS. 1–3, and 5, body 24 extends from first end 82 to second end 84, with a passage therethrough. Internal threads 86 at first end 82 facilitate attachment of body 24 to first head 22. A removable set screw 88 with an internal hex head passes through body 24 to engage first head 22 and provides a secure mount to prevent unscrewing of body 24 from first head 22 during use. An internal annular shoulder 90 and a cylindrical bearing surface 92 form a portion of an outer and end boundary of bearing arrangement 30. L-shaped seal seat 94 receives first and second annular single-lipped resilient seals 96, 98 for sealing second end 84 of body 24 to second head 26. During use, first and second seals 96, 98 rotate with body 24. First seal 96 includes a lip 100 resiliently bearing against second head 26. Second seal 98 includes a single lip 102 resiliently bearing against second head 26. Both first and second seals 96, 98, are one directional seals in that pressurized lubricant may pass more easily in one direction than the other. Also, contaminants, such as bentonite particles or water, are also restricted from passage in the opposite direction. Second seal 98 acts as wiper for large particles, and first seal 96 is intended to seal against contaminants that get past second seal 98. Such seal construction permits flushing of lubricant, and any contaminants contained within bearing arrangement 30 from an interior of swivel 20.

End surface 104 of body 24 adjacent to second end 84 is positioned adjacent to second head 26. Any engagement of end surface 104 with second head 26 during relative rotation could cause a bottoming out of swivel 20, and possible shearing of components of swivel 20 and/or the boring equipment or cable or conduit being pulled. End surface 106 at first end 82 of body 24 is adjacent to first head 22 as shown in FIG. 2.

Referring now to FIGS. 1–3, and 6, first head 22 includes external threads 110 configured to threadably engage internal threads 86 of body 24. Set screw 88 keeps body 24 from unscrewing from first head 22. Loctite® material may be used for further locking of external threads 110 to internal threads 86. Internal central chamber 112 receives a portion of center pin 28. End 114 of first head 22 forms an end portion of the boundary for bearing arrangement 30 as shown in FIGS. 2 and 3. A grease zerk 116 positioned in passage 118 of first head 22 provides access from an exterior of swivel 20 to chamber 112 which is in further communication with bearing arrangement 30. Grease zerk 116 is utilized to supply grease for bearing arrangement 30. Grease zerk 116 is also usable to flush existing grease and contaminants from bearing arrangement 30 to an exterior of swivel 20 via seals 96, 98.

Referring now to FIGS. 1–4, and 7, second head 26 includes an aperture or bore 120 coaxial with axis 32 and with internal threads 124 on a portion thereof which threadably engage threads 140 of center pin 28. Loctite® material is preferably utilized to securably lock threads 140 of center pin 28 to internal threads 124 of second head 26. A roll pin 126 passes through second head 26 in a direction transverse to longitudinal axis 32 of swivel 20. Roll pin 126 also passes through an end 142 of center pin 28.

Center pin 28 includes a shoulder or head 144 with a slot 146 usable to assemble and disassemble center pin 28 to second head 26 with a screwdriver. Extending from head 144 is shaft 148 containing threads 140 on end 142. Cylindrical portion 150 of shaft 148 forms an inner portion of the chamber for bearing arrangement 30. Extension 152 extends into bore 120 to facilitate increased fatigue strength of the connection bending loadings between second head 26 and center pin 28. In particular, extension 152 of shaft 148 is positioned in a counterbore 128 concentric with bore 120 in second head 26 as shown in FIGS. 2 and 3. Between extension 152 and threads 140 of center pin 128 is a reduced diameter thread relief 154. By countersinking extension 152 into bore 120 of second head 26, high stresses are relieved from recessed thread relief 154, such as due to a side load applied to swivel 20, especially in the case of fatigue.

Second head 26 includes a shoulder 130 positioned adjacent to end surface 104 of body 24. Any excessive engagement of shoulder 130 with end surface 104 will cause a bottoming out of swivel 20, and possible damage to the system components.

End 132 of second head 26 engages an end portion of bearing arrangement 30. Inner cylindrical surface 134 provides a sealing surface for first and second lip seals 96, 98.

Referring now to FIG. 3, preferred bearing arrangement 30 includes four angular contact bearings 160, 170, 180, 190. Additional or fewer bearings can be utilized. Each bearing 160, 170, 180,190 includes an inner race 162, 172, 182, 192, a plurality of ball bearings 164, 174, 184, 194 in each bearing, and an outer race 166, 176, 186, 196. Retainers may be used to maintain bearings 160, 170, 180, 190 in the assembled state. Bearing spaces 200 allow for communication between chamber 112 and seals 96, 98 such that grease entering at grease zerk 116 lubricates each bearing 160,170, 180,190, and also permits flushing of grease and contaminants from each bearing.

Bearings 160, 170, 180 are positioned to prevent a rotational torque from being transferred between first head 22 and second head 26 during the application of a tensile loading applied in the direction of longitudinal axis 32, such as during pulling of a cable of conduit with swivel 20. Tensile loading applied to second head 26 will be transferred to first head 22 via head 144 of center pin 28 which engages inner races 162, 172, 182, 192 of bearings 160, 170, 180, 190. Outer races 166, 176, 186 receive the tensile loading, but rotational torque is prevented from transfer due to the orientation of bearings 160, 170, 180. Tensile loading applied to first head 22 will be transferred to second head 26 in a reverse manner without transfer of rotational torque.

Fourth bearing 190 is positioned in a reverse orientation to bearings 160, 170, 180. Bearing 190 is oriented to take compression loadings applied to swivel 20 in the direction of longitudinal axis 32. The compression loading applied to second head 26 will pass through end 132 of second head 26, through inner races 162, 172, 182, 192 to outer race 196 of bearing 190 and to first head 22. However, rotational torque is not transferred due to the orientation of bearing 190. Compression loading applied to first head 22 will be transferred to second head 26 in a reverse manner without transfer of rotational torque.

Bearing 190 allows for compression loadings on swivel 20, such as during a pushing force applied to swivel 20, such as during a backing up movement of swivel 20 during the pulling operation. Bearing 190 keeps swivel 20 from bottoming out at shoulder 130 of second head 26 and end surface 104 of body 24. Such bottoming out could cause a transfer of rotational torque between first head 22 and second head 26 such that shearing of a component of swivel 20 and/or shearing of the cable or conduit, the connecting structure or the widening equipment may occur.

Bearings 160, 170, 180, 190 as angular contact bearings also allow for the application of a side load (radial load) applied to swivel 20 without a loss of the ability of swivel 20 to prevent torque transfer between first head 22 and second head 26.

In swivel 20, at least two angular contact bearings are provided in the tension (pulling) direction, and at least one in the compression (pushing) direction. Typically, in directional drilling operations followed by pulling operations, more force capacity is needed in the tension or pulling direction. The compression or pushing direction is desireable for bypassing obstructions or allowing a stuck reamer to restart rotation. The compression loadings are not as high as typically encountered in the tensile loading direction during pulling. Without an ability to handle a compression loading, if the drilling rig is used to apply a pushing load on swivel 20, the rotation would be transmitted to the cable or conduit.

Referring now to FIG. 2, slot 46 of clevis 40 is configured with a planar region 202 across the center with a radius 204, 206 in each corner. Such construction improves the strength rating and useful life of swivel 20.

Swivel 20 may become contaminated with liquids and/or solids present around swivel 20 during use. Periodic flushing of the lubricant via grease zerk 116 is preferred. Preferably, flushing of the grease after each use is advantageous to maximize the life of swivel 20, especially when used in bentonite environments. Selection of an appropriate grease also can impact the useful life of swivel 20. In particular, in a drilling environment where bentonite is present, a lithium-based petroleum grease will typically mix with any bentonite that works its way into swivel 20, creating a liquification or washing action between the grease and the bentonite where the bentonite will dissolve the grease and carry it away from bearing arrangement 30. A calcium-based (calcium complex soap) petroleum grease resists the washing effect of bentonite, thereby staying in the swivel longer and protecting the bearings. A Molub-Alloy® 6021 Rock Bit grease (calcium-based) by Tribol, 4801 West 147th Street, Hawthorne, Calif. 90250-6795 works well.

Should the moving parts of swivel 20 become contaminated with solids or liquids, swivel 20 can be disassembled for cleaning and regreasing. Should components of swivel 20 become worn or damaged during use, a rebuilding operation is possible to replace the worn or damaged components. In either case, set screw 88 and roll pin 126 are removable from assembled swivel 20 to permit disassembly of swivel 20. Any Loctite® material existing on the threads between first head 22 and body 24, or between center pin 28 and second head 26 must be removed, such as by applying heat (about 300 degrees Fahrenheit) to break down the Loctite® material. At that point, bearings 160,170,180,190 can be removed and replaced with new bearings, or the old bearings can be cleaned and replaced if not too worn or damaged. Seals 96, 98 can be cleaned, or replaced if necessary. Reassembly of the components of swivel 20 is then done, and grease applied through grease zerk 116 to grease bearing arrangement 30.

Figure 9:
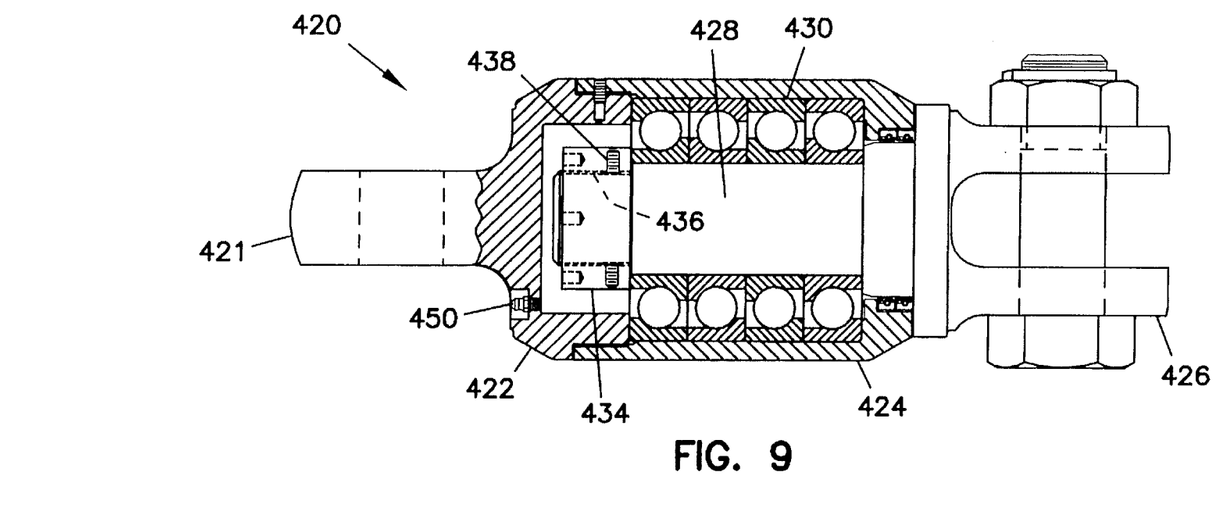
FIG. 9 is a partial cross-sectional side view of a second embodiment of a swivel in accordance with the principles of the present invention.
Figure 10:
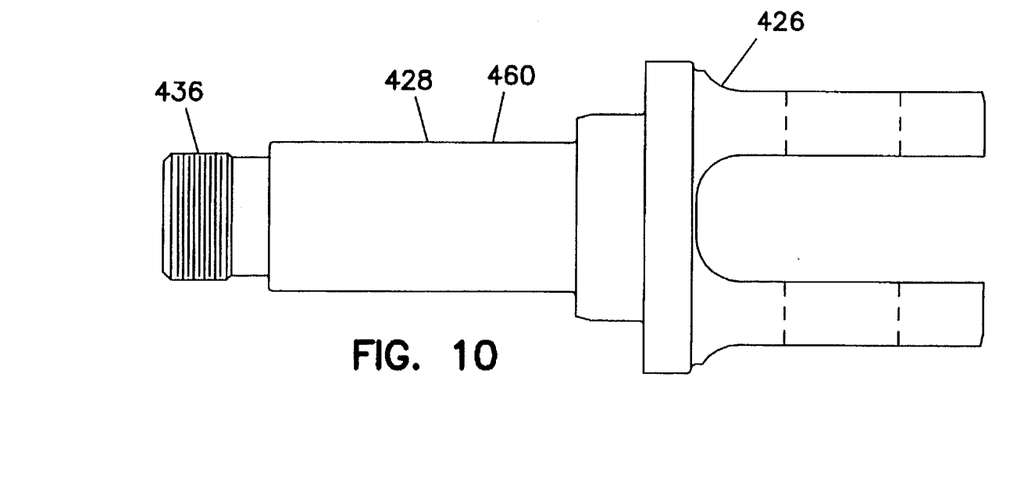
FIG. 10 is an enlarged side view of the head with the integral pin of the swivel of FIG. 9.

Referring now to FIGS. 9 and 10, a second embodiment of a swivel 420 is shown. Generally, swivel 420 includes similar components and features as swivel 20 including a first head 422, securably mounted to a body 424, and a second head 426 with a center pin 428 wherein first head 422 and body 424 rotate relative to second head 426 and center pin 428 via a bearing arrangement 430. One difference is with respect to the construction of second head 426 and center pin 428. Second head 426 includes an integral construction with center pin 428. A separate collar 434 provides a shoulder in much the same manner as shoulder 144 of center pin 28 of swivel 20. Collar 434 threadably engages threads 436 of center pin 428. At least one set screw 438 allows for a more secure mounting of collar 434 to center pin 428. Another difference with respect to swivel 420 is the connecting structure on first head 422. Instead of a clevis with two spaced apart arms as swivel 20 has, a single tang 421 is provided. FIG. 9 also shows an alternative mounting location for a grease zerk 450.

With respect to swivel 20, first head 22, body 24, and second head 26 can be made from Stressproof® (trademark of LaSalle Steel Company) or 1144 Hi Stress steel. A different material can be used for center pin 28 to address potential problems from the high stresses applied to center pin 28. For example, a cold-drawn, 41L42 heat treated steel can be used. In the case of swivel 420, center pin 428 is integral with second head 426. In this configuration, first head 422, body 424, and second head 426 with integral center pin 428 can be made from 41L42 steel. First heads 22, 422, bodies 24, 424, second heads 26, 426 and center pins 28, 428, can all be machined from metal stock.

The following provides an example of component size and strength rating for swivel 20. Bearings 160, 170, 180, 190 are 30 millimeter bore bearings with a 62 millimeter outside diameter. An outside diameter of body 24 is at 3 inches. Clevis pin 60 extends for a length of 4.5 inches. Clevis pin 60 is a 1 and ⅛ inch bolt, with a 3.75 inch shaft and with 1 and ½ inches of thread (instead of a typical 2 and ½ inches of thread in a conventional 1 and ⅛ inch bolt). Such construction keeps the threads out of the loading zone in slot 46. Seals 96, 98 are preferably a low profile type, such as a 0.5020 inch difference between the inside diameter (2.0000 inches) to the outside diameter (2.5020 inches), and a width of 0.3125 inches. Low profile seals allow for the outer diameter of surface 134 to be sufficiently large to handle bending loads. Preferably, cylindrical portion 150 of center pin 28 is made at close tolerance to the inner diameter of the bearing arrangement 30, such as 1.180 +0.000/−0.001 inches for the 30 millimeter bore bearings. The strength rating for the above example swivel is 30,000 pounds in tension and 10,000 pounds in compression.

Swivel 420 is provided with four angular contact bearings having a 130 mm outside diameter and a 60 mm inside diameter. An outside diameter of body 424 is 5.92 inches, and the clevis pins extend for 6.59 inches, with a shaft diameter of 1.75 inches allows for 90,000 pounds in tension and 30,000 pounds in compression. The seals are a low profile type, such as a 0.7530 inch difference between the inside diameter (3.2500 inches) to the outside diameter (4.0030 inches), with a width of 0.3750 inches. Preferably, cylindrical portion 460 of center pin 428 is made at close tolerance to the inner diameter of the bearing arrangement 430, such as 3.361 +0.000/−0.001 inches for the 60 millimeter bore bearings.

Other variations in relative size and strength rating are possible for swivels 20, 420. It is to be understood, that even though numerous characteristics and advantages of the invention have been set forth in the foregoing description, together with details of the structure and function of the invention, the disclosure is illustrative only, and changes may be made in detail, especially in matters as such shape, size, and arrangement of the parts within the principles of the invention to the full extent indicated by the broad general meaning of the terms which the appended claims are expressed.

What is claimed is:

1. A swivel comprising:

a first head at one end of the swivel;

a second head at an opposite end of the swivel;

a bearing arrangement between the first head and the second head permitting rotational movement of the first head relative to the second head, the bearing arrangement including at least two angular contact bearings arranged to receive a tension loading applied to the first and second heads in a pulling direction, and one angular contact bearing arranged in an opposite direction to receive a compression loading applied to the first and second heads in a pushing direction opposite to the pulling direction; and a separate center pin mounted to the second head, and the second head including a threaded aperture for securing the center pin to the second head, the center pin including threads engaged with the threaded aperture, the center pin including an unthreaded portion, the second head including a counterbore for receiving the unthreaded portion of the center pin.

2. The swivel of claim 1, wherein the bearing arrangement includes three angular contact bearings in the tension loading direction.

3. The swivel of claim 1, further comprising a calcium-based petroleum grease in the bearing arrangement.

4. The swivel of claim 1, further comprising two single lip seals between the first head and the second head, the single lip seals facing in the same direction and positioned to allow pressurized grease to exit from the bearing arrangement to an exterior of the swivel.

5. The swivel of claim 1 further comprising a clevis end on one of the first and second heads, the clevis end including two spaced apart arms with a passage through each arm, the two spaced apart arms defining a slot therebetween, and a clevis pin having a head and a shaft extending therefrom through the passages of each arm, the shaft including a threaded end, and a lock nut releasably secured to the threaded end.

6. The swivel of claim 5, wherein the lock nut includes an oval-shaped metal insert.

7. The swivel of claim 5, wherein the shaft includes an unthreaded portion positioned in the slot, the threaded end of the shaft located outside of the slot.

8. The swivel of claim 1, further comprising a separate body threadably mounted to the first head, the body having an inner shoulder, the first head having an inner end, the bearing arrangement positioned between the inner shoulder of the body and the inner end of the first head.

9. A swivel comprising:

a first head at one end of the swivel;

a second head at an opposite end of the swivel, the second head including an inner end, a threaded central aperture, and a concentric counterbore having a larger diameter than the threaded aperture;

a center pin having a head and a shaft extending therefrom, the shaft including a threaded portion with threads and an unthreaded portion, the threads of the threaded portion being positioned in the threaded aperture, with the unthreaded portion of the shaft positioned in the counterbore; and a bearing arrangement positioned between and in direct contact with the first head and the second head permitting rotational movement of the first head relative to the second head, the bearing arrangement including an inner race positioned between the head of the pin and the inner end of the second head.

10. The swivel of claim 9, further comprising a separate body threadably mounted the first head, the body having an inner shoulder, the first head having an inner end, the bearing arrangement including an outer race positioned between the inner shoulder of the body and the inner end of the first head.

* * * * *